United States Patent
Morton

[11] Patent Number: 6,151,290
[45] Date of Patent: *Nov. 21, 2000

[54] INEXPENSIVE SAFE LIGHT BEAM RECORDER

[75] Inventor: Edward W. Morton, Turnersville, N.J.

[73] Assignees: Sony Corporation, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/019,122

[22] Filed: Feb. 5, 1998

[51] Int. Cl.⁷ .................................................. G11B 7/00
[52] U.S. Cl. ............................................ 369/116; 369/54
[58] Field of Search .................................. 369/116, 100, 369/112, 121, 122, 47, 48, 49, 50, 54, 58, 59, 46.14, 120

[56] References Cited

U.S. PATENT DOCUMENTS

| | | |
|---|---|---|
| 3,530,324 | 9/1970 | Koller et al. . |
| 4,775,970 | 10/1988 | Ishii .................................. 369/54 |
| 5,126,994 | 6/1992 | Ogawa et al. .................... 369/116 |
| 5,218,400 | 6/1993 | Kashiwagi et al. ............... 355/27 |
| 5,309,424 | 5/1994 | Ogawa ............................... 369/116 |
| 5,382,966 | 1/1995 | Doi . |
| 5,477,520 | 12/1995 | Bartholomeusz .................. 369/120 |
| 5,485,449 | 1/1996 | Nakajo et al. ..................... 369/116 |
| 5,622,816 | 4/1997 | Maenza et al. ................... 430/347 |
| 5,694,381 | 12/1997 | Sako .................................. 369/58 |
| 5,742,567 | 4/1998 | Ikeya . |

FOREIGN PATENT DOCUMENTS

| | | |
|---|---|---|
| 0626680 | 11/1994 | European Pat. Off. . |
| 59132433 | 7/1984 | Japan . |
| 03141053 | 6/1991 | Japan . |
| 10283651 | 10/1998 | Japan . |
| 2144912 | 3/1985 | United Kingdom . |
| 2328776 | 3/1999 | United Kingdom . |
| WO 970117 | 7/1997 | WIPO . |

Primary Examiner—Muhammad Edun
Attorney, Agent, or Firm—Ronald P. Kananen; Rader, Fishman & Grauer

[57] ABSTRACT

A light beam optical recorder has a light emitting diode as a light source. Selecting the type of the LED used and the type of a photoresist employed with the selected LED results in creating pits of nearly laser quality. The recorder is substantially cheaper and also offers other advantages over a laser-type recorder.

16 Claims, 8 Drawing Sheets

INEXPENSIVE SAFE LIGHT BEAM RECORDER

BACKGROUND OF THE INVENTION

1. Field of the Invention

The present invention relates to an optical recording apparatus, and more particularly to an optical recording apparatus for recording data by irradiating an optical recording medium with a light beam.

2. Description of the Related Art

A disc-shaped recording medium, such as an optical disc or a magneto-optical disc, utilizing the method of optical or magneto-optical signal recording/reproducing, has been well known in the art. As such disc-shaped recording medium, there are known a recording medium of the read-only-memory type (ROM) such as a so-called compact disc (CD), a so-called write once type recording medium on which data can be written only once by the user, and a so-called overwrite type disc, such a magneto-optical disc, on which data re-recording is possible.

In optical discs such as those of the compact disc family (e.g., Audio CD, CD ROM, Video CD, CD-I, Magneto-optic CD (CD-MO), Mini discs (MD), etc.), grooves are formed on both sides of its recording track and convex and concave shallow depressions or pits are formed as information recorded thereon.

In fabricating such optical discs, a photoresist, for example, is applied to the surface of a glass substrate, the photoresist is exposed to pattern irradiation, and then developed, whereby, convex and concave photoresist patterns corresponding to the grooves or pits are formed. Then, after the etching of the surface of the substrate with the photoresist used as a mask, a plating process is performed on such convex or concave surface, and, thus, a CD-disc master is fabricated for making a stamper for forming optical discs.

As shown in FIG. 1, where a schematic structural diagram of a conventional optical recording apparatus 10 is depicted, a laser beam 12 for recording is emitted from a laser beam source 14 such as an argon-ion laser. The laser 14 is fed from a laser supply 16. The beam 12 passes through an optical system 18 that comprises means 20 for controlling beam intensity and deflection, modulating means 22, and an optical means 24 that lets the laser beam through to a recording chamber 26, as well as to an E-O-E board 28, and to a TV camera 30 connected to a TV monitor (not shown). The modulating means 22 is responsive to an electric signal representing the information to be recorded on a CD.

Conventional optical recording apparatus are expensive. Additionally, a work with laser light, which can be viewed end on or by reflection, may be harmful to viewers' vision, if performed permanently during long periods of time, and inflict damage on their eyes. Also, service life of laser installations is not believed to be long enough, especially where their high cost is taken into account.

SUMMARY OF THE INVENTION

Therefore, a main object of the present invention is to provide an apparatus for optical recording, the apparatus keeping all the advantages of the prior art but being free of the above described drawbacks.

Another object of the invention is to provide an optical recording apparatus that employs a light source which is less expensive than a laser source.

Still another object of the invention is to provide an optical recording apparatus that employs a light source that is not detrimental to the vision of someone who works constantly with the source.

Yet another object of the present invention is to provide an optical recording apparatus that employs a light source that is substantially cheaper than prior art light sources.

Still yet another object of the invention is to provide an optical recording apparatus that employs a light source that has longer service life than prior art light sources.

The above objects are attained in the present invention, in a first aspect of which, a light beam recorder comprising a light beam source and a photosensitive target is provided, the light beam source includes a light emitting diode.

The light emitting diode is suggested to be a silicon carbide type light emitting diode emanating blue light in an area centered at about 470 nm.

The photosensitive target preferably includes a photoresist relatively insensitive to radiation at about 500 nm and higher.

According to a second aspect of the present invention, there is provided a compact disc recording system. The system comprises a light beam source including a light emitting diode; modulation means modulating the light beam source in accordance with data to be recorded; a photosensitive target irradiated by the modulated light beam to produce a latent image of pits on the photosensitive target; optical means for concentrating the light beam onto the photosensitive target; means for rotating and cross-feeding the photosensitive target; and focusing means to maintain the concentrating, the focusing means being servocontrolled.

BRIEF DESCRIPTION OF THE DRAWINGS

These and other objects, features and advantages of the present invention will be best understood from the ensuing description if considered in conjunction with the accompanying drawings in which.

DESCRIPTION OF THE PREFERRED EMBODIMENT

Figure 1:
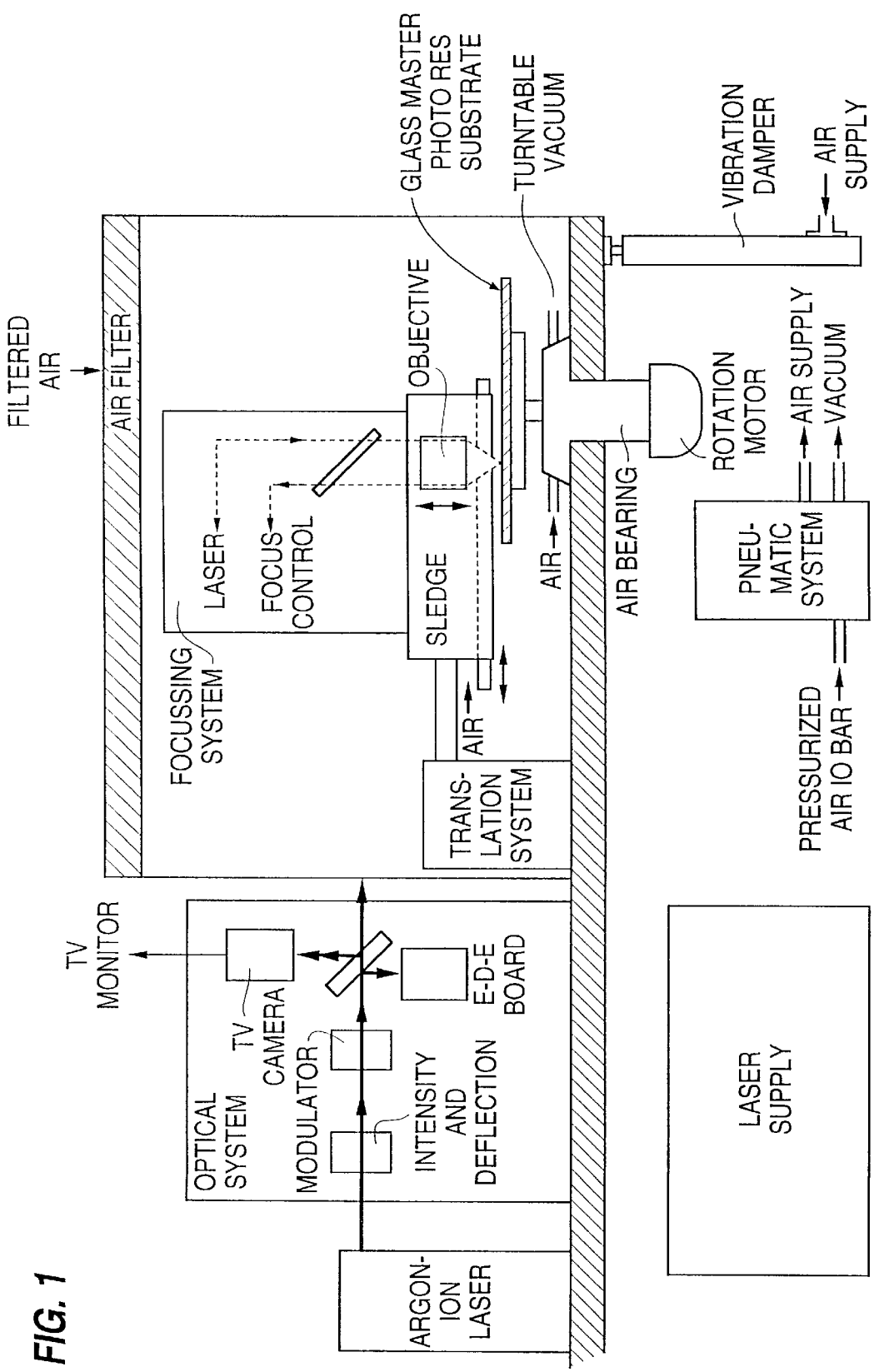
FIG. 1 is a schematic structural diagram of a conventional optical recording apparatus.
Figure 2:
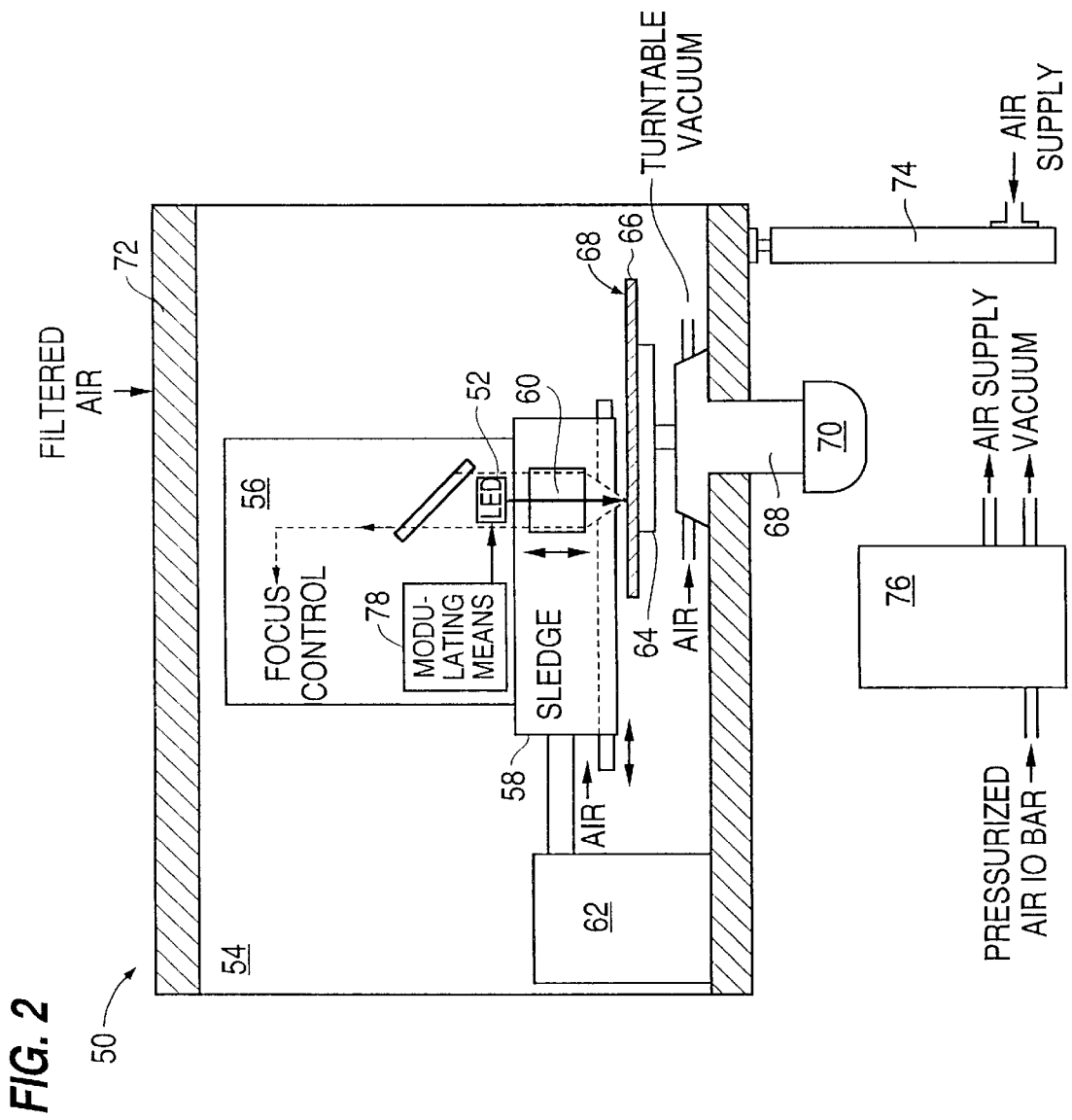
FIG. 2 is a schematic structural diagram of a light beam recording apparatus according to the present invention.

Attention is now invited to FIG. 2 where a schematic structural diagram of a light beam recording apparatus according to the present invention is presented. The apparatus 50 comprises a light emitting diode 52 as a light source.

The LED 52 is placed into a recording chamber 54 that comprises a focusing system 56, a sledge 58 carrying an objective 60, a translation system 62, and a rotating table 64 with a glass substrate 66 mounted thereon. The glass substrate 66 has a photosensitive target in the form of a photoresist layer 68 deposited thereon.

Movement of the sledge 58 is controlled by the translation system 62 receiving commands from the focusing system 56 that is servocontrolled and conventionally uses a reflected light for focusing purposes.

The rotating table 64 rests on an air bearing 68 and is set into rotation by a motor 70. Shown also in FIG. 2 are an air filter 72 for the chamber 54, a vibration damper 74 supporting the chamber 54, and a pneumatic system 76 that is used for converting pressurized air arriving at the system 54 from an outside source (not shown) at 10 bar into the air supply and vacuum for the rotating table 64.

The LED 52 is fed by modulating means 78, a conventional circuitry that uses a fast transistor as a modulating source for the LED 52. The transistor is switched by a digitally coded signal carrying the information to be recorded on a CD. It is appreciated by those skilled in the art, that in the CD systems, as in most storage or transmission of digital data, the A/D conversion of data is adopted to cope with the characteristics of the storage medium. Such transformation, called modulation, involves the addition of redundant information to the data, and modulation of the combined data to compensate for medium characteristics. The modulation method for the CD systems, called eight-to-fourteen modulation (EFM), is an 8-data-bit to 14-channel-bit conversion block code with a space of three channel bits (called merging bits) for every converted 14 channel bits for connecting the blocks.

Figure 5:
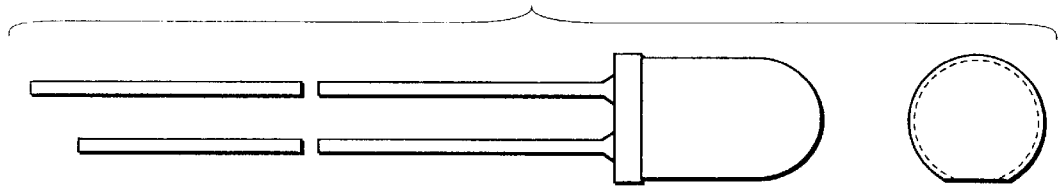
FIG. 5 shows a typical T-1¾ LED used for the purposes of the present invention.
Figure 6:
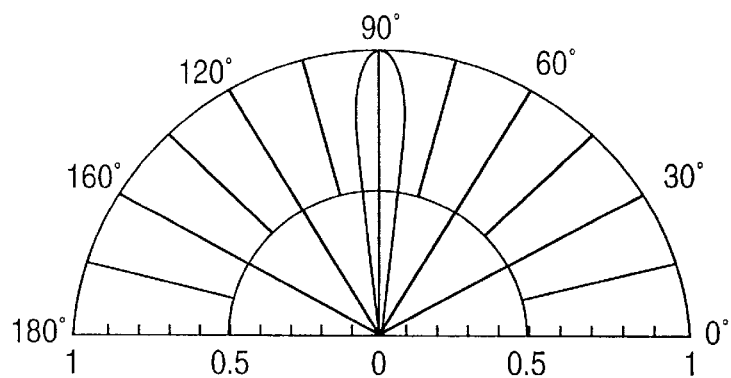
FIG. 6 illustrates a radiation pattern of the T-1¾ LED.
Figure 7:
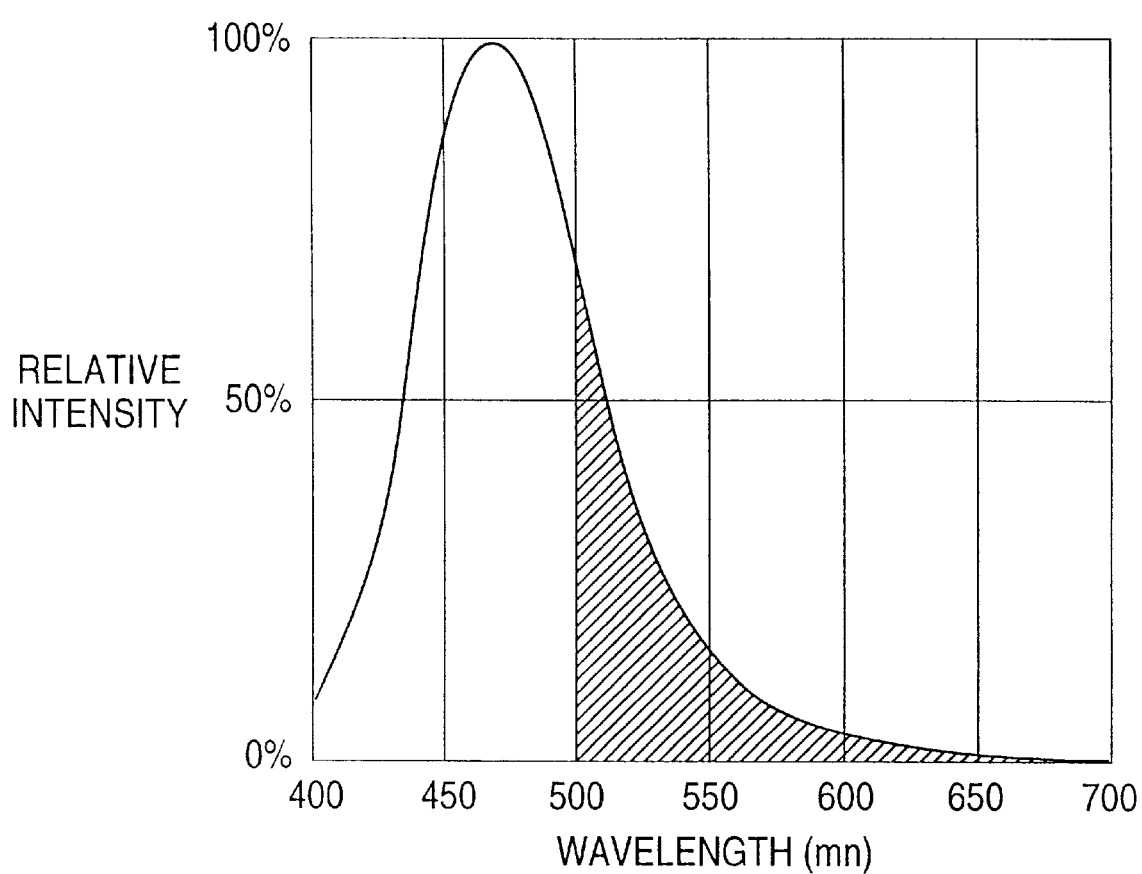
FIG. 7 is a graph showing change of relative emission intensity of the LED versus wavelength.

The LED 52 is preferably a silicon carbide "blue" device with fast switching on-off characteristics in a 430 to 495 nm wavelength range, such as a T-1 or T-1¾ type LED. The latter type is schematically shown in FIG. 5. LEDs of this type have a radiation pattern as shown in FIG. 6, and their intensity peak is at about 470 nm as can be seen in FIG. 7.

Figure 8:
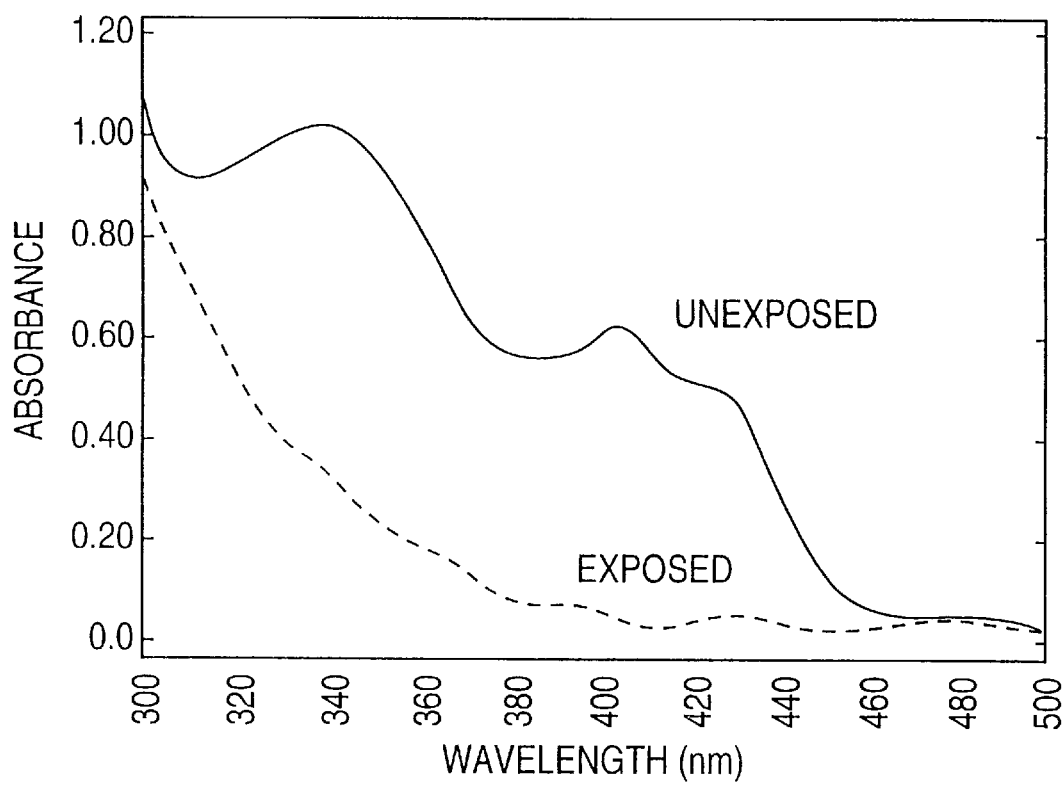
FIGS. 8 and 9 are graphs illustrating absorbency spectrum of two types of a photoresist used for implementation of the present invention.
Figure 9:
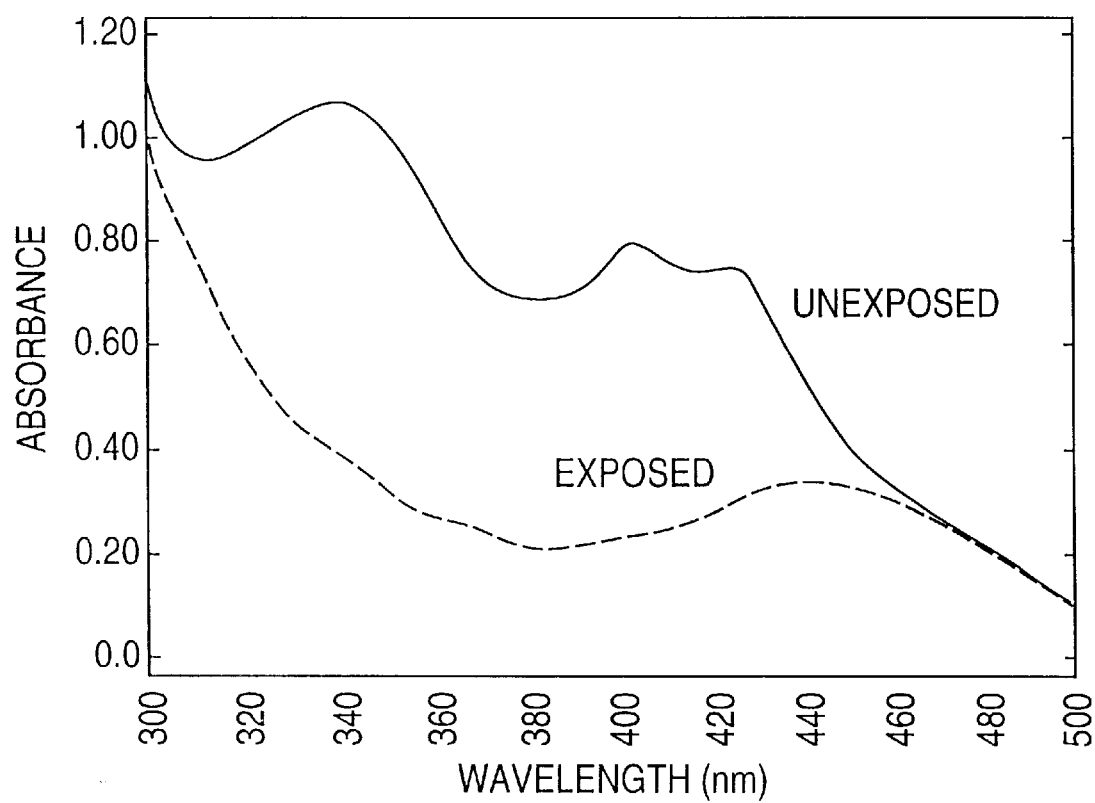

A proper selection of the photoresist is important from the standpoint of likening the LED emission to that produced by a laser. Specifically, a Shipley Microposit S1800 Series photoresist is believed to be particularly convenient for the purposes of the present invention. The photoresist is relatively sensitive in the 430 to 495 nm wavelength range and is not responsive for 500 nm and greater wavelength that can be best seen in FIGS. 8 and 9 where graphs illustrating the relationship between wavelength and absorbance are shown for Microposit S1813 and S1813 J2 photoresists, respectively. The photoresist insensitivity at wavelengths of 500 nm and higher means that the LED radiation from 500 nm and higher is effectively attenuated that is schematically shown in FIG. 7 by crosshatching the respective area. Thus, a much more narrow and close to monochromatic range from 425 to 500 nm is created.

An emitting end face of the LED 52 being small enough, and the above considerations regarding a proper and compatible selection of the types of the LED 52 and the photoresist 62 being taken into account, the radiation pattern of the LED 52 will fill the lens of the objective 60 in a manner very similar to that which a laser beam would produce. The emission of the LED 52 will create pits on the CD, of the shape presented in FIGS. 3 and 4. Specifically, in FIG. 3, a complete family of pit lengths that range from 3T to 11T is shown created by EFM. A minimum pit length is from about 0.833 $\mu$m to about 0.972 $\mu$m, whereas a maximum pit length lies within a range of about 3.054–3.56 $\mu$m depending on velocity (1.2–1.4 m/s). The encoded digital information is stored in the length of the pits and the gaps between them, with the transitions from pit to gap (and vice versa) playing a key role. The pits are formed as a latent image in the photoresist. Then, for example, a NaOH solution can be used in a conventional manner to etch the pits and thus to fix the image. After that, a number of conventional steps is performed to convert the photoresist with the fixed image into a master and a stamper.

Figure 3:
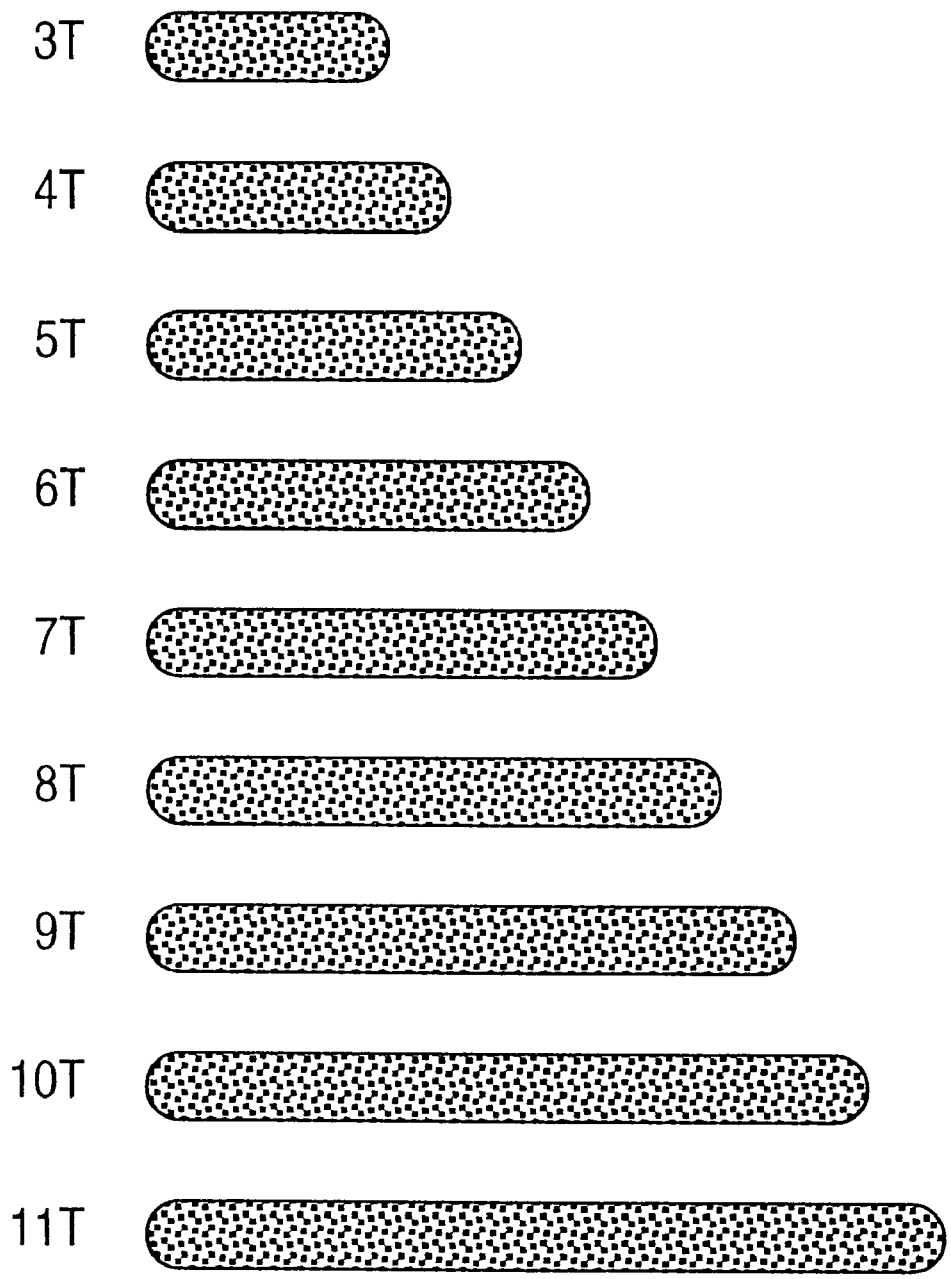
FIG. 3 is a diagrammatic view for illustrating a pit length family created by LED in implementing the present invention.
Figure 4:
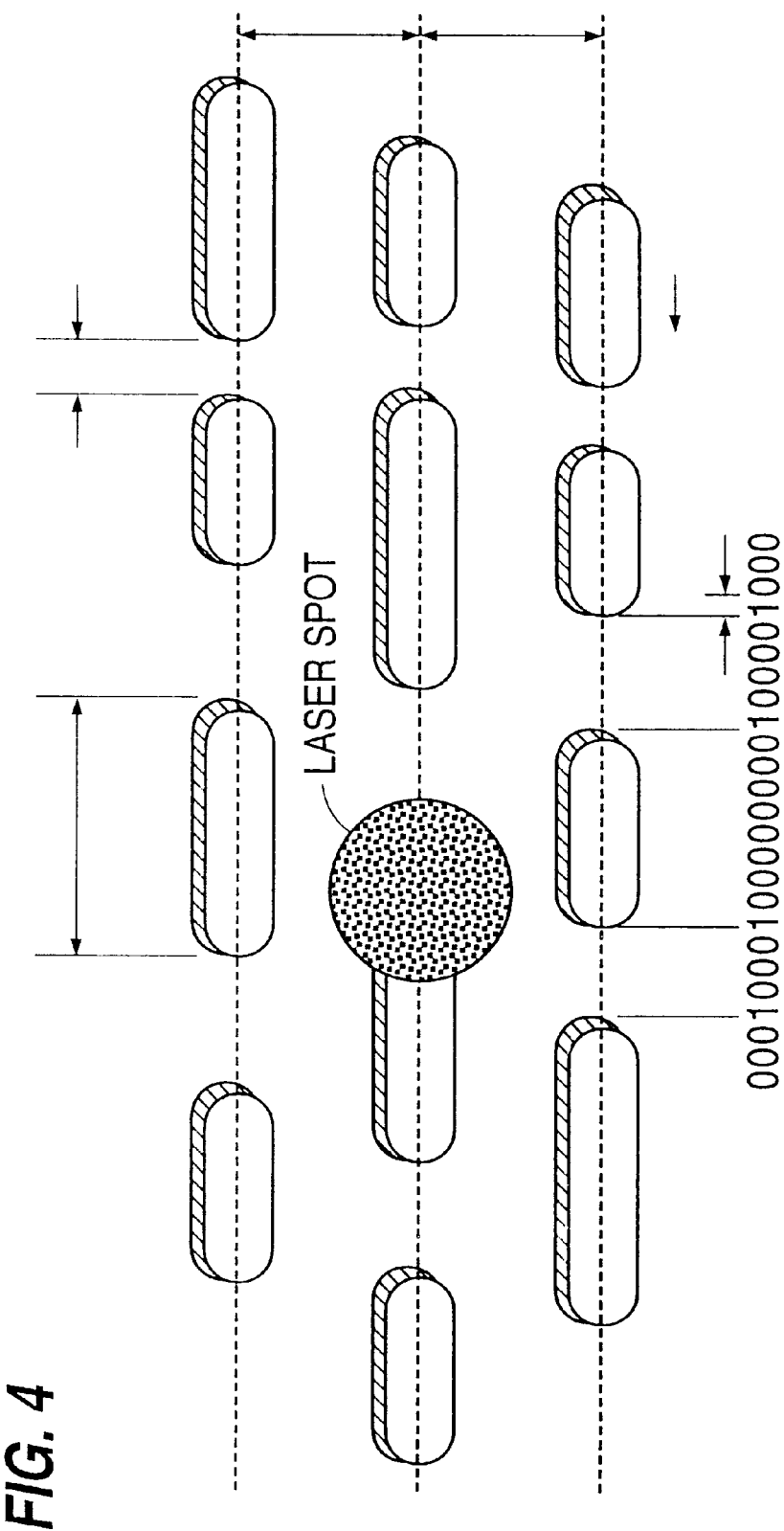
FIG. 4 is a diagrammatic view for illustrating pits from the family of FIG. 3 aligned along a spiral track, and a data reading laser spot.

FIG. 4 depicts oval pits from the family of FIG. 3 aligned along a spiral track on a CD surface, and a data reading laser round spot. The laser spot reads data as an intensity modulation of its reflected beam and supplies it to a photodiode that feeds input to a digital processing circuitry (the photodiode and the circuitry not shown).

It can be concluded from the above that the light beam recorder according to the present invention offers major advantages over the conventional apparatus. It does not need an expensive gas laser, acoustooptical modulator, mirrors, laser power supply and associated drive circuitry. A light emitting diode as a light source for the purposes of the present invention is substantially cheaper, it is a safe lighting device that can be harmlessly viewed directly. Also, it can last much longer in comparison with a laser.

While a preferred embodiment of the present invention has been disclosed hereinabove, it is to be understood that this embodiment is given by example only and not in a limiting sense. Those skilled in the art may make various modifications and additions to the preferred embodiment chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

I claim:

1. An optical disc light beam recorder comprising:
   a source of a light beam modulated in accordance with information to be recorded, and
   a photosensitive target irradiated by said light beam, whereby pits are formed in said photosensitive target,
   wherein said light beam source includes a non-lasing, light emitting diode, and
   wherein said photosensitive target includes a photoresist relatively insensitive to radiation at about 500 nm and higher.

2. The light beam recorder as claimed in claim 1, wherein said light emitting diode is a silicon carbide type light emitting diode emanating blue light in an area centered at about 470 nm.

3. The light beam recorder as claimed in claim 1, wherein said modulation includes an on-and-off switching of said light beam source.

4. The light beam recorder as claimed in claim 1, further comprising:
   optical means for concentrating said light onto said photosensitive target;
   means for rotating said photosensitive target; and
   focusing means to maintain said concentrating, said focusing means being servocontrolled.

5. The light beam recorder as claimed in claim 1, wherein said photosensitive target, which includes a photoresist relatively insensitive to radiation at about 500 nm and higher, also has a peak sensitivity to radiation with a wavelength less than 500 nm.

6. A method of recording data on an optical disc master comprising:

modulating a non-lasing, light source in accordance with a data stream to be recorded, thereby selectively exposing a photoresist layer on a substrate, wherein said light source emits light over a range of wavelengths centered at a peak-intensity wavelength; and selecting said photoresist layer in accordance with said range of wavelengths such that said photoresist layer will be relatively insensitive to a first portion of said range of wavelengths and relatively sensitive to a second portion of said range of wavelengths.

7. The method of claim 6, further comprising developing said photoresist layer subsequent to said selective exposing.

8. The method of claim 6, further comprising selecting as said light source a light emitting diode that is a silicon carbide type light emitting diode emanating blue light in an area centered at about 470 nm.

9. The method of recording data as claimed in claim 6, wherein said selecting said photoresist layer further comprises selecting said photoresist layer such that said second portion of said range of wavelengths over which said photoresist layer is relatively sensitive is 75 nm wide.

10. The method of recording data as claimed in claim 6, wherein said selecting said photoresist layer further comprises selecting said photoresist layer such that said second portion of said range of wavelengths over which said photoresist layer is relatively sensitive is 425 to 500 nm.

11. The method of recording data as claimed in claim 6, wherein said light source is a light emitting diode.

12. An optical disc light beam recorder comprising:

a light source means modulated to selectively emit light in accordance with information to be recorded, and a photosensitive target irradiated by said light source means, whereby pits are formed in said photosensitive target, wherein said light source means is a non-lasing, light source means, and wherein said photosensitive target includes a photoresist relatively insensitive to radiation at about 500 nm and higher.

13. The light beam recorder as claimed in claim 12, wherein said light source means includes a light emitting diode.

14. The light beam recorder as claimed in claim 13, wherein said light emitting diode is a silicon carbide type light emitting diode emanating blue light in an area centered at about 470 nm.

15. An optical disc light beam recorder comprising:

a source of a light beam modulated in accordance with information to be recorded; and a photosensitive target irradiated by said light beam, whereby pits are formed in said photosensitive target, wherein said light beam source includes a non-lasing, light source which emits light over a range of wavelengths centered at a peak-intensity wavelength, and wherein said photosensitive target is relatively insensitive to light with a wavelength more than 30 nm above said peak-intensity wavelength.

16. A recorder as claimed in claim 15, wherein said light source is a light emitting diode.

* * * * *